US009508181B2

(12) United States Patent
Kim et al.

(10) Patent No.: US 9,508,181 B2
(45) Date of Patent: Nov. 29, 2016

(54) ORDERING AND RENDERING BUFFERS FOR COMPLEX SCENES WITH CYCLIC DEPENDENCY

(75) Inventors: Byungmoon Kim, Sunnyvale, CA (US); Nathan A. Carr, San Jose, CA (US); Grayson Squier Lang, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 450 days.

(21) Appl. No.: 13/223,215

(22) Filed: Aug. 31, 2011

(65) Prior Publication Data

US 2013/0127891 A1 May 23, 2013

(51) Int. Cl.
| | |
|---|---|
| *G09G 5/00* | (2006.01) |
| *G06T 15/00* | (2011.01) |
| *G06T 11/00* | (2006.01) |
| *G06T 11/60* | (2006.01) |
| *G06T 19/00* | (2011.01) |
| *G06T 15/04* | (2011.01) |
| *G06F 9/44* | (2006.01) |

(52) U.S. Cl.
CPC ............. *G06T 15/00* (2013.01); *G06T 11/001* (2013.01); *G06T 11/60* (2013.01); *G06F 9/4443* (2013.01); *G06T 15/04* (2013.01); *G06T 19/00* (2013.01)

(58) Field of Classification Search
CPC ... G06T 15/04; G06T 11/001; G06T 15/005; G06T 11/60; G06T 19/00
See application file for complete search history.

(56) References Cited

U.S. PATENT DOCUMENTS

| | | | |
|---|---|---|---|
| 5,929,864 A | 7/1999 | Picott et al. | |
| 6,556,200 B1 | 4/2003 | Pfister et al. | |
| 6,791,552 B2 | 9/2004 | Gould et al. | |
| 7,406,685 B2* | 7/2008 | Fleehart et al. | 717/141 |
| 2005/0099419 A1* | 5/2005 | Castonguay et al. | 345/420 |
| 2006/0048085 A1* | 3/2006 | Tyler et al. | 716/6 |
| 2006/0101356 A1* | 5/2006 | Allen et al. | 716/3 |
| 2011/0067017 A1* | 3/2011 | Ghosh-Roy | G06F 8/34 717/155 |
| 2011/0083125 A1* | 4/2011 | Komatsu et al. | 717/149 |
| 2011/0090236 A1* | 4/2011 | Calsyn et al. | 345/581 |
| 2011/0307507 A1* | 12/2011 | Zhou et al. | 707/769 |
| 2012/0176364 A1* | 7/2012 | Schardt et al. | 345/419 |

OTHER PUBLICATIONS

Real-Time Recursive Specular Reflections on Planar and Curved Surfaces Using Graphics Hardware KH Nielsen, NJ Christensen—Journal of WSCG, 2002—wscg.zcu.cz.*
"Efficient representation and streaming of 3Dscenes", Computers & Graphics 28 (2004) pp. 15-24, by Sahm et al.*
Tarjan, R. E., "Depth-first search and linear graph algorithms," SIAM Journal on Computing 1 (2), pp. 146-160, Jun. 1972.

\* cited by examiner

*Primary Examiner* — Ulka Chauhan
*Assistant Examiner* — Saptarshi Mazumder
(74) *Attorney, Agent, or Firm* — Wolfe-SBMC

(57) ABSTRACT

A method, system, and computer-readable storage medium are disclosed for rendering a scene with render targets having instances of cyclic dependency. A dependency graph for a plurality of render targets in a scene may be determined automatically. A plurality of strongly connected components in the dependency graph may be determined automatically. Each of the plurality of strongly connected components may comprise one or more of the plurality of render targets. A topological order for the plurality of strongly connected components may be determined automatically. The scene may be rendered based on the topological order using the plurality of render targets.

20 Claims, 7 Drawing Sheets

Dependency Graph 402

Strongly Connected Components 404

Directed Acyclic Graph 406

Rendered Scene
500

Rendered Scene 510

ORDERING AND RENDERING BUFFERS FOR COMPLEX SCENES WITH CYCLIC DEPENDENCY

BACKGROUND

Field of the Invention

The present invention is directed to computer systems; and more particularly, it is directed to rendering of digital images.

Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image rendering is the process of generating digital images using a computing device, e.g., a computer system. Using specialized software programs and appropriate graphics hardware, complex digital images may be generated and displayed. In rendering a complex image or scene (i.e., a scene containing many elements), many image buffers may be used for temporary storage of elements of the scene. When effects such as reflection, refraction, and shadows are used in a scene, dependencies may be created between the buffers. Using prior approaches, developers have manually analyzed the dependencies and hard-coded the rendering order. However, such tasks may be burdensome to developers and may also be prone to errors and insufficient performance.

SUMMARY

Various embodiments of systems, methods, and computer-readable storage media for rendering a scene with render targets having instances of cyclic dependency are disclosed. A dependency graph for a plurality of render targets in a scene may be determined automatically. A plurality of strongly connected components in the dependency graph may be determined automatically. Each of the plurality of strongly connected components may comprise one or more of the plurality of render targets. A topological order for the plurality of strongly connected components may be determined automatically. Automatically determining the topological order for the plurality of strongly connected components may comprise performing a depth-first search on the dependency graph. The scene may be rendered based on the topological order using the plurality of render targets.

In one embodiment, the plurality of render targets may comprise a plurality of cyclically dependent render targets (i.e., at least two render targets that share one or more instances of cyclic dependency). The cyclic dependency may be broken by using contents of at least one of the plurality of cyclically dependent render targets from a previous frame. In other words, the contents of at least one of the plurality of render targets from the previous frame may be automatically preserved and then reused in the current frame. In the first frame of a sequence of frames, a blank texture may be generated for at least one of the cyclically dependent render targets.

Figure 1:
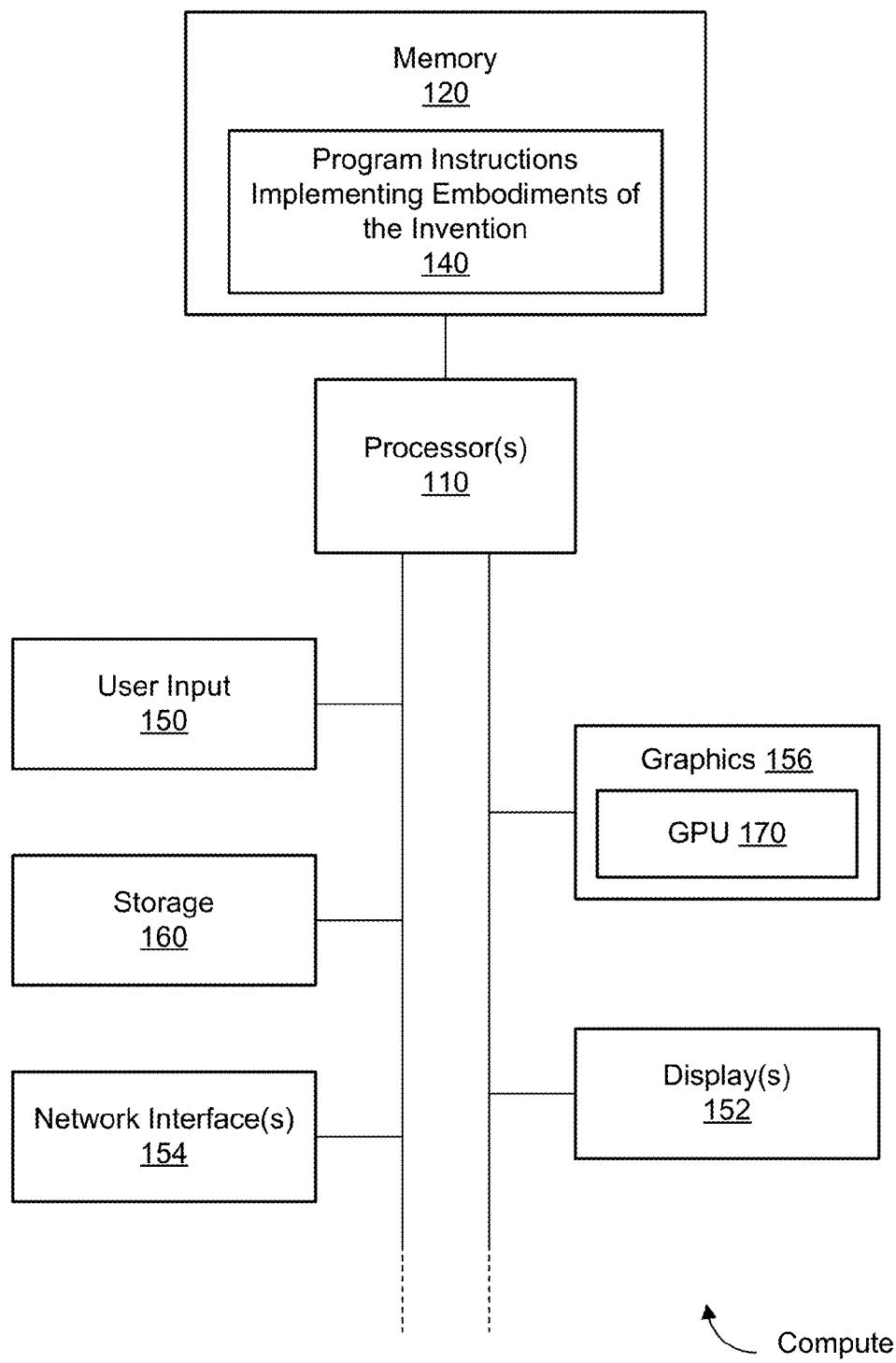
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the computer graphics or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to render scenes with render targets having instances of cyclic dependency. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Disclosed herein are various embodiments of systems, methods, and computer-readable storage media for rendering a scene with render targets having cyclic dependency. Each render target (e.g., buffer) in a scene may be rendered only once despite the dependency relationships among the render targets. The rendering order may be tightly coupled to tasks such as clearing buffers, copying buffers, setting states, and switching render targets. For example, during the rendering process, some state values may need to be changed while switching between drawing tree billboards to drawing a shadow map. Many such state changes may occur, and it is desirable to ensure that they are set up properly when rendering to a specific target. As disclosed herein, a rendering order for render targets may be automatically determined for streamlined development and efficient rendering. The automatically determined rendering order may further be used for efficient rendering of a scene by minimizing render target switches, preventing excessive clears and copies of buffers, and minimizing state changes.

Figure 2:
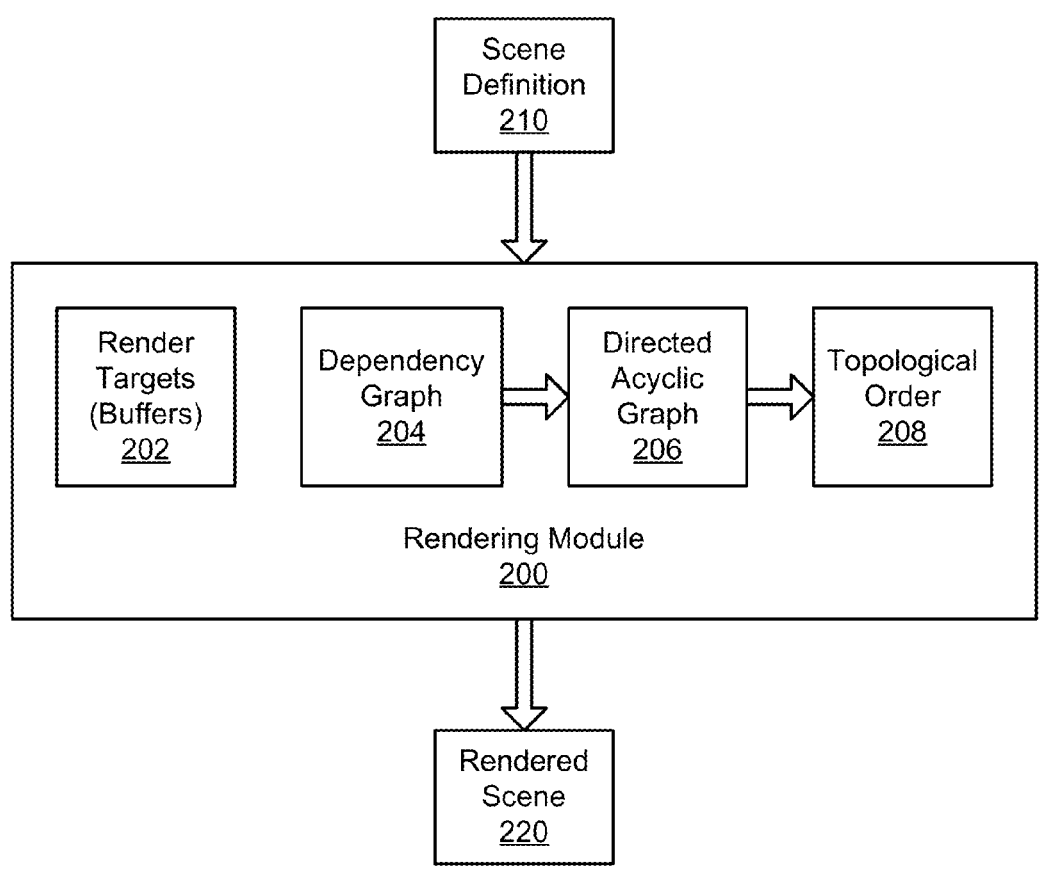
FIG. 2 illustrates an example rendering module, according to one embodiment.

FIG. 2 illustrates an example rendering module 200 that may implement embodiments of a method for rendering a scene. In one embodiment, the rendering module 200 may provide an interface that includes one or more interface elements via which a programmer, user, or other module may initiate, interact with, direct, and/or control the method performed by the rendering module 200. The rendering module 200 may obtain at least one scene definition 210 as input. The scene definition 210 may comprise raster graphics, vector graphics, or a combination thereof. The scene definition 210 may comprise one or more two-dimensional (2-D) graphics elements and/or one or more three-dimensional (3-D) graphics elements. The 2-D and 3-D graphics elements may comprise geometric primitives (e.g., points, lines, polygons, Bézier curves, and text characters). By rendering the scene definition 210, the rendering module 200 may generate a rendered scene 220 as output. In one embodiment, the rendered scene 220 may comprise one frame in a video sequence or image sequence. In another embodiment, the rendered scene 220 may comprise a still image that is not part of a video sequence or image sequence.

The rendering module 200 may be implemented as or in a stand-alone application or as a module of or plug-in for an image processing and/or presentation application. Examples of types of applications in which embodiments of the rendering module 200 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed. Specific examples of applications in which embodiments may be implemented include, but are not limited to, Adobe® Flash® Player, Adobe® Photoshop®, and Adobe® Illustrator®. In addition to generating the rendered scene 220, the rendering module 200 may be used to display, manipulate, modify, and/or store output images, for example to a memory medium such as a storage device or storage medium. In generating the rendered scene 220, the rendering module 200 may utilize appropriate graphics hardware 156 such as a GPU 170.

The rendering module 200 may comprise a plurality of render targets 202. Each render target may comprise a buffer or other suitable element of graphics hardware used in the rendering of the scene definition 210. A buffer comprises a memory usable for storing graphics data. In generating the rendered scene 220, one of the render targets 202 may be used for temporary storage of graphical elements in the scene, either individually or in combination with other graphical elements. The render targets may be used for a variety of purposes. For example, the render targets 202 may be used as reflection texture buffers, shadow map buffers, linear depth buffers, high dynamic color range buffers, reduction buffers, billboard texture buffers, ambient occlusion buffers, and/or other suitable intermediate buffers, such as buffers used for ping-ponging, separated blur, or resolving antialiasing. Use of each of the render targets 202 may be necessitated by one or more elements of the scene definition 210. For example, if the scene definition 210 includes a reflective surface, then the rendering module may use a reflection texture buffer as one of the render targets 202 in generating the rendered scene 220. In one embodiment, the render targets 202 may be allocated by the rendering module based on the scene definition 210.

As will be described in greater detail below, the rendering module 200 may render a scene with the render targets 202 having at least one instance of cyclic dependency. The dependencies may be implicitly specified (e.g., by a programmer) in the scene definition 210. For example, if the scene definition 210 includes a reflection map, then it is desirable to render the reflection map before the associated reflective surface is rendered (i.e., before the reflection map is used as a texture). As another example, if the scene definition 210 includes an element that casts a shadow, then it is desirable to render the shadow map before the associated shadow-casting element is rendered. To render a complex scene having such dependencies, the rendering module 200 may automatically determine an order in which to use the render targets 202 in the generation of the rendered scene 220.

As will be described in greater detail below with respect to FIG. 3, the rendering module 200 may generate a dependency graph 204, a directed acyclic graph 204, and a topological order 208. In one embodiment, the generation of the dependency graph 204 may be performed automatically and/or programmatically. In one embodiment, the generation of the directed acyclic graph 206 may be performed automatically and/or programmatically. In one embodiment, the generation of the topological order 208 may be performed automatically and/or programmatically.

Figure 3:
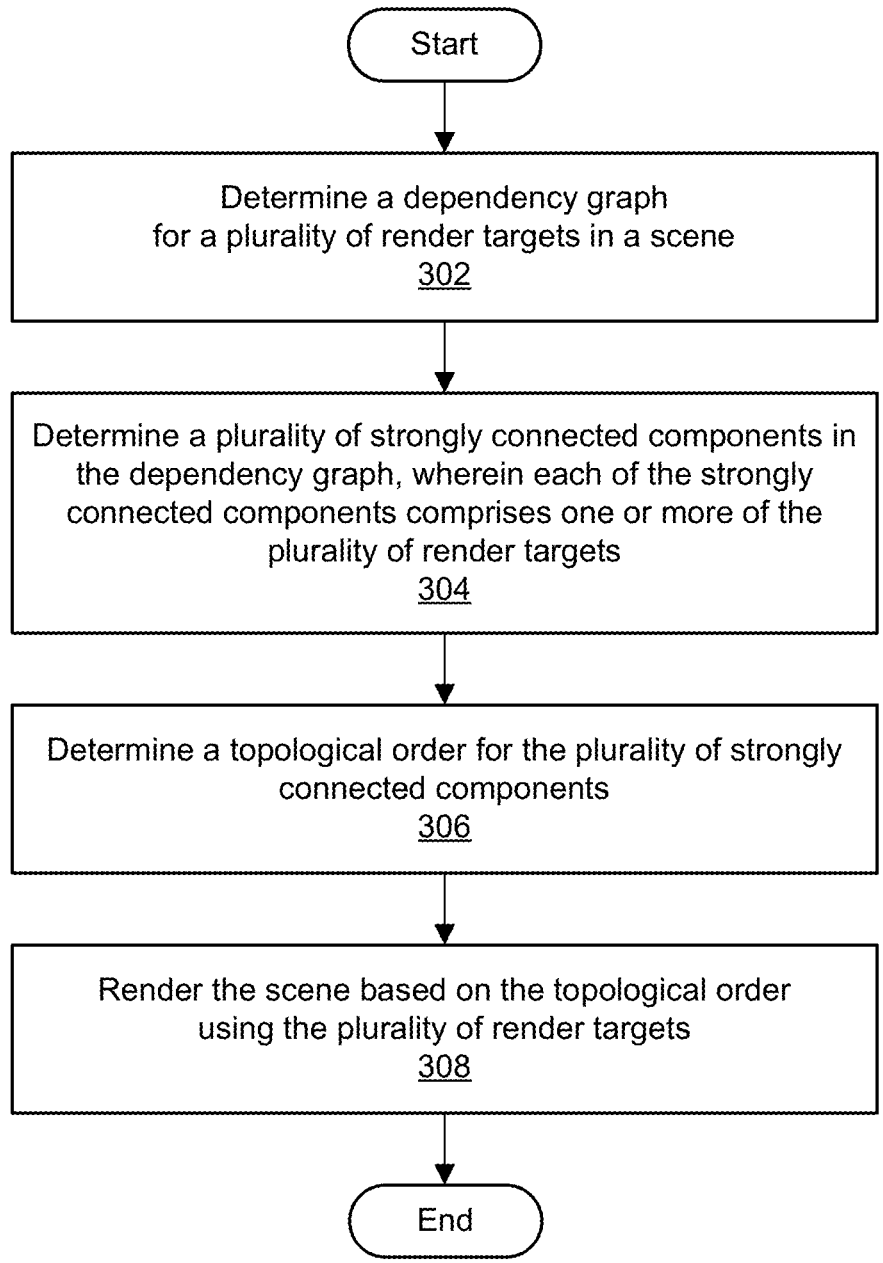
FIG. 3 is a flowchart illustrating a method for rendering a scene with render targets having cyclic dependency, according to one embodiment.

FIG. 3 is a flowchart illustrating a method for rendering a scene with render targets having cyclic dependency, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 302 of FIG. 3, a dependency graph for a plurality of render targets 202 in a scene may be determined. The dependency graph may be determined automatically based on the elements of a scene definition 210. The dependency graph 204 may specify dependencies between or among the render targets 202. The dependency graph may comprise a directed graph having a plurality of nodes and one or more directed edges. Each node may represent a render target 202. The dependency graph may include one or more instances of cyclic dependency (also referred to as circular dependencies). For example, if the scene includes two reflective surfaces that face each other, the relationship between the two reflective surfaces may be characterized as a cyclic dependency between the corresponding nodes in the dependency graph 204. In one embodiment, the dependency graph 204 may be manually configured by a developer in place of or in addition to the automatic configuration described herein.

As shown in block 304, a plurality of strongly connected components in the dependency graph may be determined. Each of the strongly connected components may comprise one or more of the plurality of render targets 202. Each of the strongly connected components may comprise a subgraph of the dependency graph 204 in which there is a path from each node in the subgraph to every other node in the subgraph. The strongly connected components may be determined using any suitable technique. In one embodiment, for example, Tarjan's algorithm may be used to find the strongly connected components in the dependency graph 204. By contracting each of the strongly connected components to a single node, a directed acyclic graph 206 may be generated. The directed acyclic graph 206 may comprise a directed graph with no directed cycles, such that a sequence of edges beginning with a particular node will not loop back to that particular node again. The directed acyclic graph may eliminate the cyclic dependencies of the dependency graph 204.

As shown in block 306, a topological order for the plurality of strongly connected components may be determined. In one embodiment, the topological order 208 may be determined using the directed acyclic graph 206. The topological order 208 may comprise an ordering of the nodes of the directed acyclic graph 206 such that the starting endpoint of every edge occurs earlier in the ordering than the ending endpoint of the edge. In the rendering of the scene definition 210, the topological order 208 may be used as an evaluation order for the render targets 202.

As shown in block 308, the scene may be rendered based on the topological order using the plurality of render targets.

Each of the strongly connected components may be rendered in the topological order. In one embodiment, within each of the strongly connected components, the render targets may be rendered in any suitable order. In one embodiment, if the scene is a frame in an image sequence, a cyclic dependency within a strongly connected component may be broken by using the result from a previously rendered frame. In other words, the result from a previously rendered frame may be used when the corresponding buffer is needed in a subsequent frame but has not yet been rendered in the subsequent frame.

In one embodiment, the dependency graph may be built automatically. Beginning with the primary render buffer, the scenegraph may be programmatically explored to find meshes. For each mesh, any dependency associated with the mesh may be automatically added to the dependency graph by adding the appropriate nodes and edges. For example, if a mesh uses a material that is a reflection map, then the node representing the primary buffer will be dependent on the node representing the reflection map in the dependency graph. This dependency is represented in the dependency graph as a directed edge between the two nodes. As another example, if the scenegraph associated with the reflection map has a TV object whose screen is another render texture buffer, then the node representing the reflection map will be dependent on the node representing the render texture buffer in the dependency graph. Again, this dependency is represented in the dependency graph as a directed edge between the two nodes.

In one embodiment, the dependency graph may be configured manually (e.g., by a developer). For example, an effect such as bloom may be added to a post-processing pipeline by manually configuring the dependency graph for additional graphics operations. In the case of bloom, the additional graphics operations may include reductions and repeated blur operations. These additional operations may be added manually to the dependency graph as new nodes, and the dependencies may be specified as directed edges in the dependency graph.

To permit manual configuration of the dependency graph, a suitable interface may allow the developer to add elements to the graph. In one embodiment, temporary render targets (i.e., render textures) may be created for a bloom operation using the following program code:

```
    var RB2:RenderTexture = new RenderTexture( instance.width/2,
instance.height/2, "Buf/2" );
    var RB4A:RenderTexture = new RenderTexture( instance.width/4,
instance.height/4, "Buf/4" );
    var RB4B:RenderTexture = new RenderTexture( instance.width/4,
instance.height/4, "Buf/4" );
```

In one embodiment, rendering jobs for the bloom operation may then be defined as nodes using the following program code:

```
    var toRB2:RGNodePPElement = new RGNodePPElement( color,
RB2, RGNodePPElement.HDR_REDUCTION_2x2, "Reduction
color->2" );
    var toRB4:RGNodePPElement = new RGNodePPElement( RB2,
RB4A, RGNodePPElement.HDR_REDUCTION_2x2, "Reduction
2->A" );
    var blur0:RGNodePPElement = new RGNodePPElement( RB4A,
RB4B, RGNodePPElement.HDR_BLUR_3x3, "Blur0 AB" );
    var blur1:RGNodePPElement = new RGNodePPElement( RB4B,
RB4A, RGNodePPElement.HDR_BLUR_3x3, "Blur1 BA" );
```

-continued

```
    var blur2:RGNodePPElement = new RGNodePPElement( RB4A,
RB4B, RGNodePPElement.HDR_BLUR_3x3, "Blur2 AB" );
    var blur3:RGNodePPElement = new RGNodePPElement( RB4B,
RB4A, RGNodePPElement.HDR_BLUR_3x3, "Blur3 BA" );
    var toPrimary:RGNodePPElement = new RGNodePPElement(
color,null, RGNodePPElement.HDR_BLOOM, "Bloom" );
    toPrimary.bloomTexture = RB8A;
```

In one embodiment, the dependency graph may then be configured for the bloom operation by adding edges between nodes using the following program code:

```
instance.renderGraphRoot.clearAllPrerequisite( );
RGNode.addStaticGraphEdge( color.renderGraphNode, toRB2 );
RGNode.addStaticGraphEdge( toRB2, toRB4 );
RGNode.addStaticGraphEdge( toRB4, blur0 );
RGNode.addStaticGraphEdge( blur0, blur1 );
RGNode.addStaticGraphEdge( blur1, blur2 );
RGNode.addStaticGraphEdge( blur2, blur3 );
RGNode.addStaticGraphEdge( blur3, toPrimary );
RGNode.addStaticGraphEdge( toPrimary, instance.renderGraphRoot );
```

Figure 4A:
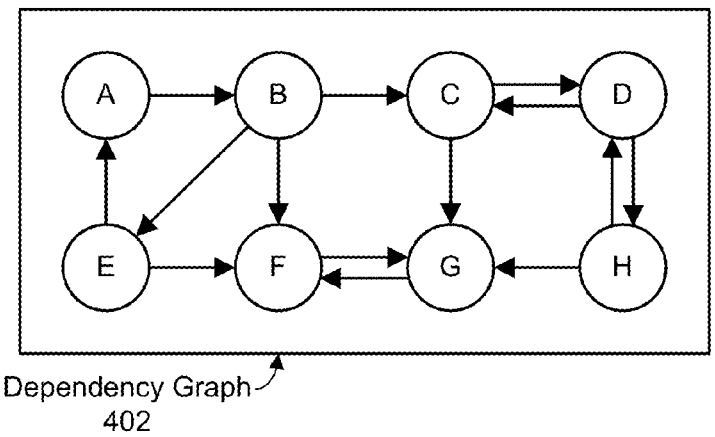
FIG. 4A illustrates an example of a dependency graph of render targets, according to one embodiment.

FIG. 4A illustrates an example of a dependency graph 402 of render targets, according to one embodiment. Each node in the dependency graph 402 may represent one of the render targets 202, and each edge may represent a dependency between two of the render targets. As shown in the example, the dependency graph includes instances of cyclic dependency such as the dependency between nodes F and G.

Figure 4B:
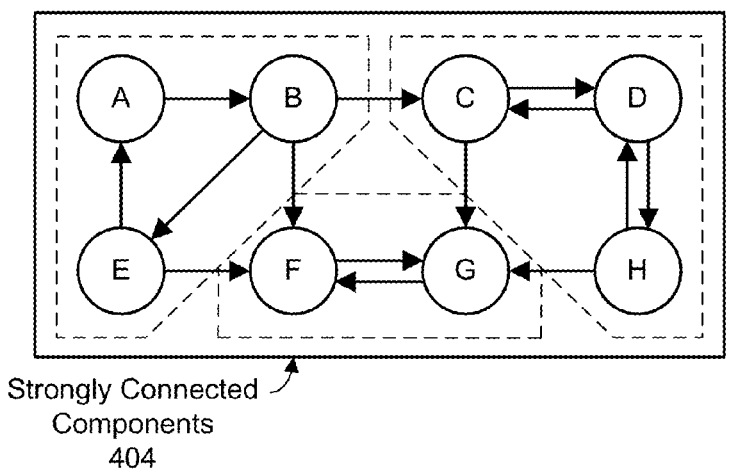
FIG. 4B illustrates an example of a graph of strongly connected components, according to one embodiment.

FIG. 4B illustrates an example of a graph of strongly connected components 404, according to one embodiment. As discussed above, each of the strongly connected components may comprise a subgraph of the dependency graph 402 in which there is a path from each node in the subgraph to every other node in the subgraph. As further illustrated in FIG. 4C, the strongly connected component 404A may include nodes A, B, and E; the strongly connected component 404B may include nodes C, D, and H; and the strongly connected component 404C may include nodes F and G.

Figure 4C:
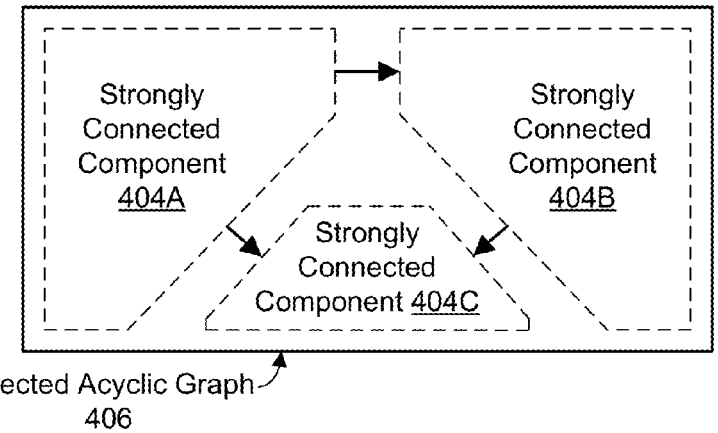
FIG. 4C illustrates an example of a directed acyclic graph, according to one embodiment.

FIG. 4C illustrates an example of a directed acyclic graph 406, according to one embodiment. The directed acyclic graph 406 may represent a condensation of the dependency graph 402. As discussed above, by contracting each of the strongly connected components 404 to a single node, a directed acyclic graph 406 may be generated. The directed acyclic graph 406 may eliminate the cyclic dependencies of the dependency graph 402.

In the topological order, the nodes may be listed such that for every graph edge (u→v), u comes before v in the list. Therefore, every dependency may be considered valid in the output sequence representing the topological order. In generating the topological order, a depth-first search may be performed among the nodes. In one embodiment, Tarjan's algorithm for finding strongly connected components may be used to perform the depth-first search and generate the topological order. Given a dependency graph, Tarjan's algorithm may produce a topologically sorted order of the strongly connected components and acyclic nodes in the graph.

In one embodiment, Tarjan's algorithm may be performed according to the following pseudo-code to produce a list of strongly connected components in topological order:

```
protected function traverseToOrderRenderSources(
    orderedRenderSources:Vector.<RenderSource>,
    stackSCC:Vector.<RenderSource>
):void
{
    setVisited( );
    __lowlink = __index = __indexCounter++;
    stackSCC.push(this);
    setPainted1( );
    for each ( var prereq:RenderSource in __prereqs )
    {
        if( !prereq.isVisited( ) ) {
            prereq.traverseToOrderRenderSources(
orderedRenderSources, stackSCC );
            if( prereq.__lowlink < __lowlink ) __lowlink =
                prereq.__lowlink;
        } else
        if( prereq.isPainted1( ) ) { // in stack?
            if( prereq.__lowlink < __lowlink ) __lowlink =
                prereq.__index;
        }
    }
    if(__lowlink != __index)
        return;
    var listSCC:Vector.<RenderSource> = new
Vector.<RenderSource>;
    var w:RenderSource;
    do {
        w = stackSCC.pop( );
        w.setUnpainted1( );
        listSCC.push(w);
    } while (w != this);
    // Generate a sequence representing topological order of SCCs
    var nSCC:uint = listSCC.length;
    var nIter:int = (nSCC <= __maxRenderIterations) ? nSCC :
__maxRenderIterations;
    for( var i:uint=0; i<nIter; i++)
    {
        for( var j :int=0; j<nSCC; j++) {
            orderedRenderSources.push(listSCC[j % nSCC]);
        }
    }
}
```

In one embodiment, Tarjan's algorithm may take a directed graph (e.g., dependency graph 204) as input and may generate a partition of the graph's nodes into the graph's strongly connected components. Each node of the graph may appear in one and only one strongly connected component, even if the node appears in a strongly connected component by itself. Tarjan's algorithm may begin a depth-first search from the node that represents the final job that may be in the primary buffer. Subsequent depth-first searches may be conducted on any nodes that have not yet been found. In one embodiment, the search may not explore any node that has already been encountered. The strongly connected components may form the subtrees of the search tree; the roots of the search tree may be the roots of the strongly connected components.

Each node may be placed on a stack in the order in which it is encountered in the depth-first search. When the search returns from a subtree, the nodes may be taken from the stack, and it may be determined whether each node is the root of a strongly connected component. If a node is determined to be the root of a strongly connected component, then that node and all of the nodes taken off the stack before that node are determined to form the strongly connected component.

To find the root of a strongly connected component, each node may be given a depth search index to number the nodes consecutively in the order in which they are encountered. Each node may also be assigned a lowlink value that is equal to the index of some other node reachable from the node. The lowlink value is equal to the depth search index value if no other node is reachable from the node, or else it is less than the index value. Accordingly, the node is the root of a strongly connected component if and only if the lowlink value equals the index value. The lowlink value may be computed during the depth-first search such that it is always known when needed.

The index variable may be the depth-first search node number counter. The node stack may start out empty and may store the history of nodes explored but not yet committed to a strongly connected component. The node stack is not the normal depth-first search stack, because nodes are not popped as the search returns up the tree; rather, they are only popped when an entire strongly connected component has been found. The outermost loop of the algorithm may search each node that has not yet been visited, thereby ensuring that nodes that are not reachable from the first node are still traversed eventually.

When each node finishes recursing, if its lowlink is still set to its index, then the node is determined to be the root node of a strongly connected component that includes all of the nodes below it on the stack. The algorithm may pop the stack up to and including the current node, and the algorithm may present all of these nodes as a strongly connected component. In one embodiment, no strongly connected component will be identified before any of its successors in Tarjan's algorithm. Therefore, the algorithm may generate a list of the strongly connected components in a topological order.

Within each strongly connected component, nodes may be ordered in any suitable manner. In one embodiment, the result of a previous frame may be used in a subsequent frame. Double buffering and buffer renaming may be used to accomplish such re-use. When rendering the next frame in a sequence, the contents of buffers that contain previous frame results may be kept instead of being destroyed. If the buffer is not rendered in the current frame, the target buffer may be renamed to avoid overwriting. Accordingly, each node within a strongly connected component may be rendered only once. By reusing previous frames, minor artifacts may be introduced in exchange for the efficient rendering described herein. In a reflective surface, for example, the reflection may be absent from the first frame, and some of the reflected results in subsequent frames may be images from a previous frame. If the scene changes abruptly, the reflection based on the previous frame may be inaccurate. In real-time applications, however, these minor artifacts may be unnoticed.

Figure 5A:
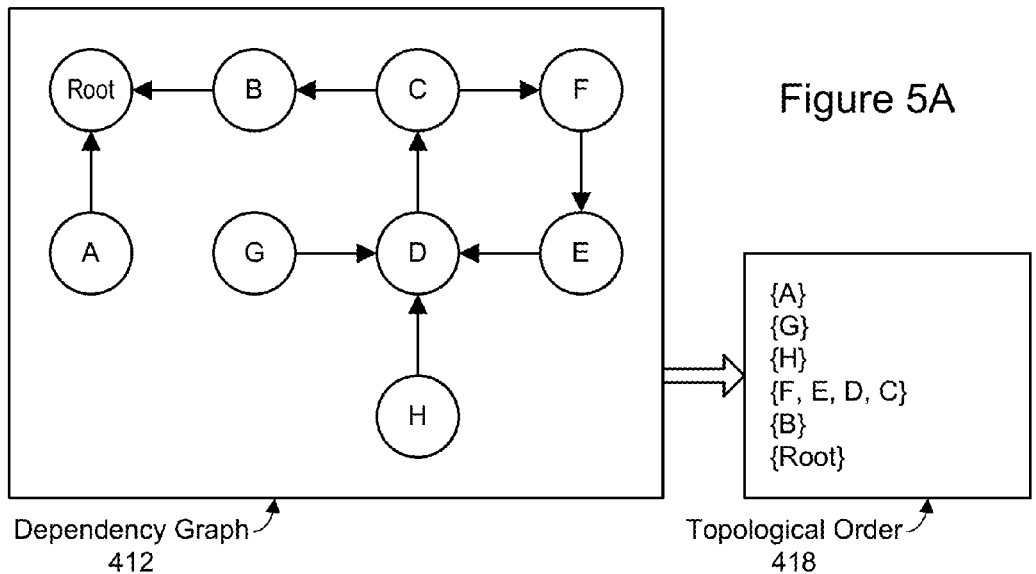
FIG. 5A illustrates an example of a dependency graph of render targets and a resulting topological order generated by a method for rendering a scene with render targets having cyclic dependency, according to one embodiment.

FIG. 5A illustrates an example of a dependency graph 412 of render targets and a resulting topological order 418 generated by a method for rendering a scene with render targets having cyclic dependency, according to one embodiment. As discussed above, the dependency graph 412 may be generated automatically from a scene definition. Each node in the dependency graph 412 may represent a render target. As also discussed above, the strongly connected components may be determined in the dependency graph to generate a directed acyclic graph. A topological order 418 may be determined based on the directed acyclic graph: {A}, {G}, {H}, {F, E, D, C}, {B}, {Root}. The topological order 418 may be used as an evaluation order for the render targets in rendering the scene.

Figure 5B:
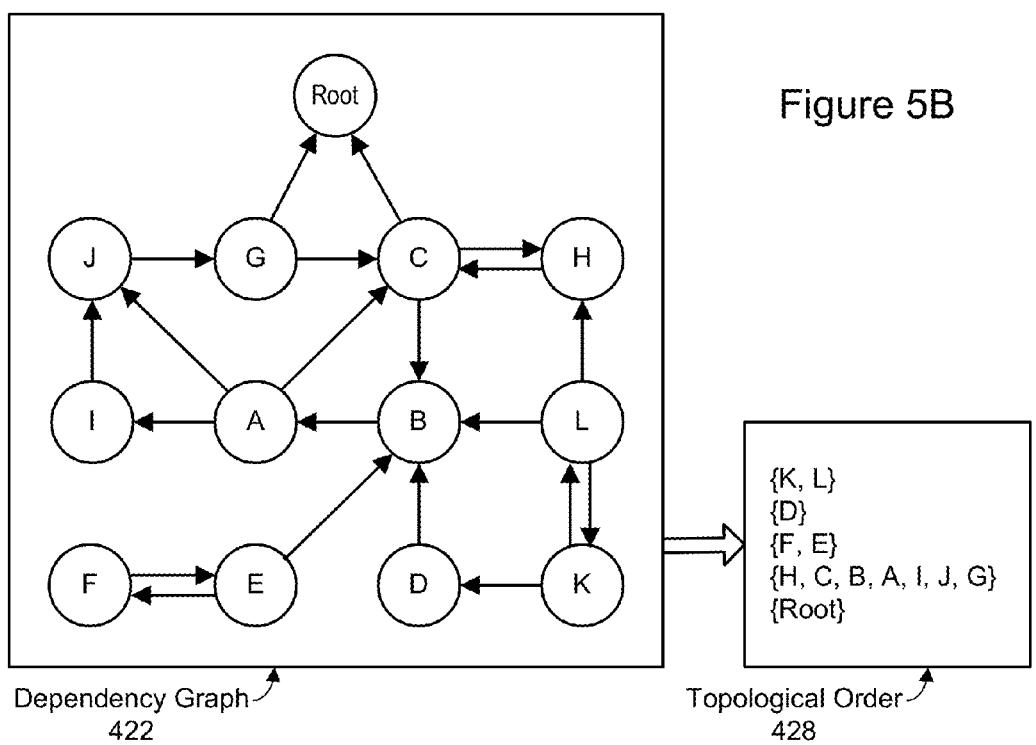
FIG. 5B illustrates an example of a dependency graph of render targets and a resulting topological order generated by a method for rendering a scene with render targets having cyclic dependency, according to one embodiment.

FIG. 5B illustrates another example of a dependency graph 422 of render targets and a resulting topological order 428 generated by a method for rendering a scene with render targets having cyclic dependency, according to one embodiment. As discussed above, the dependency graph 422 may be generated automatically from a scene definition. Each node in the dependency graph 422 may represent a render target. As also discussed above, the strongly connected components may be determined in the dependency graph to generate a directed acyclic graph. A topological order 428 may be determined based on the directed acyclic graph: {K, L}, {D}, {F, E}, {H, C, B, A, I, J, G}, {Root}. The topological order 428 may be used as an evaluation order for the render targets in rendering the scene.

In one embodiment, a parallel processing capability of computing hardware (e.g., a plurality of processors 110 and/or a GPU 170 having parallelism) may be used for further efficiency. Each node in the dependency graph may be treated as a rendering job. A plurality of sequences of nodes may be generated instead of one sequence, and each sequence may be sent to a different processor in a multi-processor environment or to a different core in a multi-core environment. Load-balancing techniques may be used for efficient use of processing resources. For example, in the example dependency graph 412 of FIG. 5A, the nodes {A}, {G}, and {H} may be rendered in parallel, followed by {F, E, D, C}, {B}, and {Root}. As another example, in the example dependency graph 422 of FIG. 5B, the nodes {K, L}, {D}, and {F, E} may be rendered in parallel, followed by {H, C, B, A, I, J, G} and {Root}.

Figure 6:
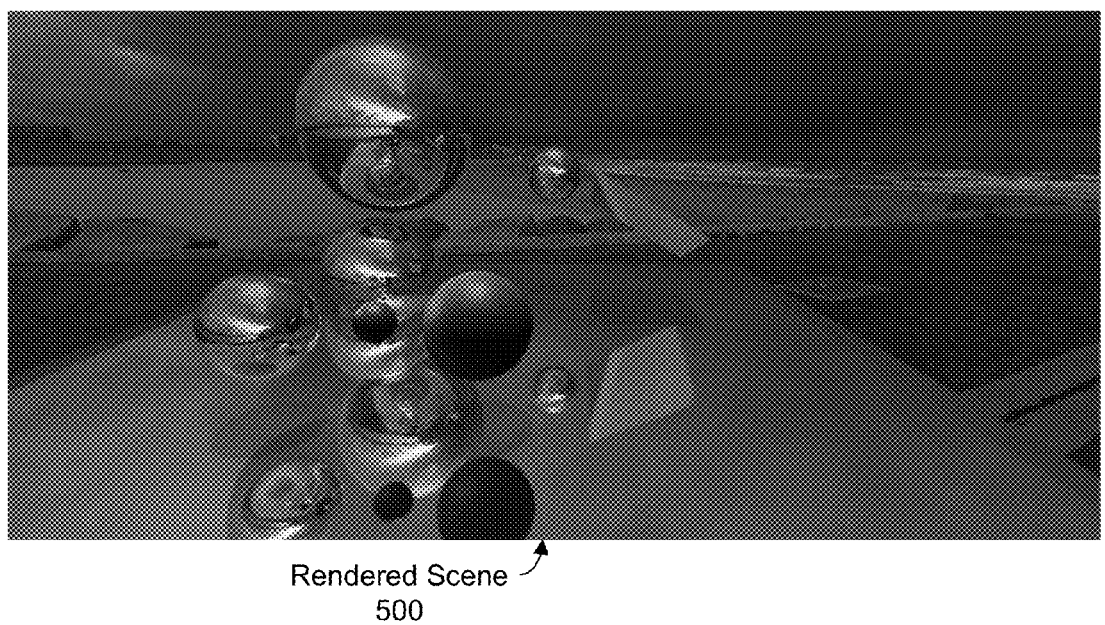
FIG. 6 illustrates an example of a rendered scene, according to one embodiment.

FIG. 6 illustrates an example of a rendered scene 500, according to one embodiment. As shown, the rendered scene 500 is a complex scene including various reflections and shadows. As discussed herein, the rendered scene 500 may be generated by the rendering module 200 using a method for rendering a scene with render targets having cyclic dependency.

In rendering the scene 500, the following topological order may be generated for the various strongly connected components and acyclic nodes: {SmallMirrorRefMap, MirrorRefMap, RenderTextureCube, RenderTextureCube, RenderTextureCube, RenderTextureCube}, {ShadowMap}, { Cub e ShadowMap}, {RenderGraph [Root]}. Based on this topological order, the elements may be rendered in the following order:
  0. SmallMirrorRefMap
  1. MirrorRefMap
  2. RenderTextureCube
  3. RenderTextureCube
  4. RenderTextureCube
  5. RenderTextureCube
  6. ShadowMap
  7. CubeShadowMap
  8. RenderGraph [Root]

Figure 7:
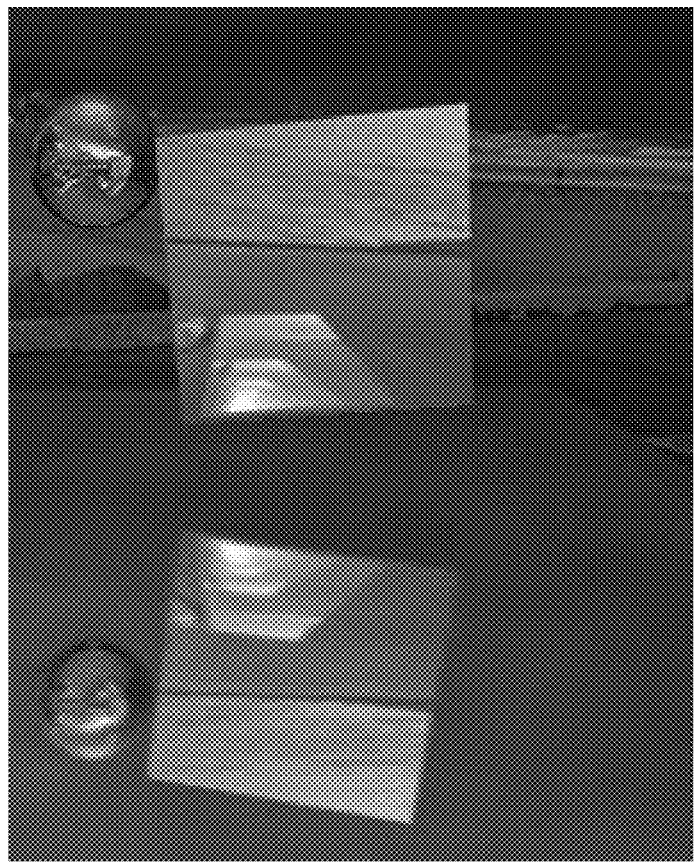
FIG. 7 illustrates an example of a rendered scene having a cyclic dependency, according to one embodiment.

FIG. 7 illustrates an example of a rendered scene 510 having a cyclic dependency, according to one embodiment. As shown, the rendered scene 510 is a complex scene including a cyclic dependency between two reflective surfaces. As discussed herein, the rendered scene 510 may be generated by the rendering module 200 using a method for rendering a scene with render targets having cyclic dependency. As discussed above, the cyclic dependency may be broken by leaving one of the reflective surfaces blank in the first frame and using the results of previous frames in subsequent frames.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    obtaining, by a computing device, a scenegraph that describes render targets of a scene, including at least a primary render buffer and one or more meshes;
    building, by the computing device, a dependency graph having nodes that represent a plurality of the render targets in the scene, wherein the dependency graph is configured to reduce a number of render target switches in relation to at least one rendering of the scene from the scenegraph using the render targets, wherein the dependency graph is built using the scenegraph, and wherein building the dependency graph comprises:
        adding, by the computing device, a node to the dependency graph that represents the primary render buffer;
        programmatically exploring, by the computing device, the scenegraph beginning at the primary render buffer to find the one or more meshes; and
        responsive to finding the one or more meshes, adding, by the computing device, nodes and edges to the dependency graph that represent the one or more meshes;
    determining, by the computing device, a plurality of strongly connected components in the dependency graph, each of the plurality of strongly connected components comprising one or more of the plurality of render targets;
    determining, by the computing device, a topological order for the plurality of strongly connected components; and
    rendering, by the computing device, the scene based on the topological order using the plurality of render targets, including switching between the render targets a reduced number of times in relation to the at least one rendering of the scene.

2. The method as recited in claim 1, wherein rendering the scene comprises:
    preserving contents of at least one of the plurality of render targets from a previous frame; and
    reusing the contents in a current frame.

3. The method as recited in claim 1, wherein the plurality of render targets comprises a plurality of cyclically dependent render targets, wherein the plurality of cyclically dependent render targets share at least one cyclic dependency.

4. The method as recited in claim 3, wherein rendering the scene comprises:
    breaking the cyclic dependency, comprising using contents of at least one of the plurality of cyclically dependent render targets from a previous frame.

5. The method as recited in claim 3, wherein rendering the scene comprises:
    generating a blank texture for at least one of the plurality of cyclically dependent render targets in a first frame of a sequence of frames.

6. The method as recited in claim 1, wherein determining the topological order for the plurality of strongly connected components comprises:
    performing a depth-first search on the dependency graph.

7. The method as recited in claim 1, wherein the scene that is rendered based on the topological order includes at least one inaccuracy relative to the scenegraph of the scene, the at least one inaccuracy resulting from elimination of cyclic dependencies of the dependency graph.

8. A system, comprising:
at least one processor; and
a memory coupled to the at least one processor, wherein the memory stores program instructions that are executable by the at least one processor to perform operations comprising:
- building a dependency graph having nodes that represent a plurality of render targets in a scene that include a primary render buffer, wherein the dependency graph is configured to reduce at least one of a number of buffer clears or buffer copies in relation to at least one rendering of the scene from a scenegraph using the render targets, and wherein building the dependency graph comprises:
  - adding a node representative of the primary render buffer to the dependency graph; and
  - programmatically exploring, from the primary render buffer, the scenegraph that describes the render targets of the scene to find the other render targets and add nodes that represent the other render targets to the dependency graph;
- determining a plurality of strongly connected components in the dependency graph, each of the plurality of strongly connected components comprising one or more of the plurality of render targets;
- contracting each group of the strongly connected components in the dependency graph into a respective node that represents the group;
- generating an acyclic graph in which cyclic dependencies of the dependency graph are eliminated based on the contraction of the strongly connected components into the respective nodes that represent the groups;
- determining a topological order for the plurality of render targets in the scene based on the acyclic graph; and
- rendering the scene based on the topological order using the plurality of render targets, including at least one of clearing buffers or copying buffers a reduced number of times in relation to the at least one rendering of the scene.

9. The system as recited in claim 8, wherein rendering the scene comprises:
preserving contents of at least one of the plurality of render targets from a previous frame; and
reusing the contents in a current frame.

10. The system as recited in claim 8, wherein the plurality of render targets comprises a plurality of cyclically dependent render targets, wherein the plurality of cyclically dependent render targets share at least one cyclic dependency.

11. The system as recited in claim 10, wherein rendering the scene comprises:
breaking the cyclic dependency, comprising using contents of at least one of the plurality of cyclically dependent render targets from a previous frame.

12. The system as recited in claim 10, wherein rendering the scene comprises:
generating a blank texture for at least one of the plurality of cyclically dependent render targets in a first frame of a sequence of frames.

13. The system as recited in claim 8, wherein determining the topological order for the plurality of strongly connected components comprises:
performing a depth-first search on the dependency graph.

14. The system as recited in claim 8, further comprising:
determining the acyclic graph based on the dependency graph.

15. A non-transitory computer-readable storage device storing program instructions that are executable on a computer to perform operations comprising:
- obtaining a scenegraph that describes render targets of a scene, including at least a primary render buffer and one or more meshes;
- building a dependency graph having nodes that represent a plurality of the render targets in the scene, wherein the dependency graph is configured to reduce a number of render target switches in relation to at least one rendering of the scene from the scenegraph using the render targets, wherein the dependency graph is built using the scenegraph, and wherein building the dependency graph comprises:
  - adding a node to the dependency graph that represents the primary render buffer;
  - programmatically exploring the scenegraph beginning at the primary render buffer to find the one or more meshes; and
  - responsive to finding the one or more meshes, adding nodes and edges to the dependency graph that represent the one or more meshes;
- processing the dependency graph according to one or more dependency graph processing techniques to determine a topological order for the plurality of render targets in the scene; and
- rendering the scene based on the topological order using the plurality of render targets, including switching between the render targets a reduced number of times in relation to the at least one rendering of the scene.

16. The computer-readable storage device as recited in claim 15, wherein rendering the scene comprises:
preserving contents of at least one of the plurality of render targets from a previous frame; and
reusing the contents in a current frame.

17. The computer-readable storage device as recited in claim 15, wherein the plurality of render targets comprises a plurality of cyclically dependent render targets, wherein the plurality of cyclically dependent render targets share at least one cyclic dependency.

18. The computer-readable storage device as recited in claim 17, wherein rendering the scene comprises:
breaking the cyclic dependency, comprising using contents of at least one of the plurality of cyclically dependent render targets from a previous frame.

19. The computer-readable storage device as recited in claim 17, wherein rendering the scene comprises:
generating a blank texture for at least one of the plurality of cyclically dependent render targets in a first frame of a sequence of frames.

20. The computer-readable storage device as recited in claim 15, wherein determining the topological order for the plurality of strongly connected components comprises:
performing a depth-first search on the dependency graph.

* * * * *